United States Patent
Lee

(10) Patent No.: US 10,773,167 B2
(45) Date of Patent: Sep. 15, 2020

(54) METHOD AND APPARATUS FOR REPLAYING VIDEO OF PLAYING GAME

(71) Applicant: NHN Entertainment Corp., Seongnam-si (KR)

(72) Inventor: Dongjin Lee, Seongnam-si (KR)

(73) Assignee: NHN ENTERTAINMENT CORP., Seongnam-si (KR)

( * ) Notice: Subject to any disclaimer, the term of this patent is extended or adjusted under 35 U.S.C. 154(b) by 0 days.

(21) Appl. No.: 16/287,131

(22) Filed: Feb. 27, 2019

(65) Prior Publication Data

US 2019/0262710 A1    Aug. 29, 2019

(51) Int. Cl.
| | |
|---|---|
| *A63F 13/00* | (2014.01) |
| *A63F 13/497* | (2014.01) |
| *A63F 13/5255* | (2014.01) |
| *A63F 13/85* | (2014.01) |
| *A63F 13/355* | (2014.01) |

(52) U.S. Cl.
CPC .......... *A63F 13/497* (2014.09); *A63F 13/355* (2014.09); *A63F 13/5255* (2014.09); *A63F 13/85* (2014.09)

(58) Field of Classification Search
None
See application file for complete search history.

(56) References Cited

U.S. PATENT DOCUMENTS

| | | | |
|---|---|---|---|
| 9,235,957 B2 * | 1/2016 | Gagner | G07F 17/32 |
| 9,253,533 B1 * | 2/2016 | Morgan | H04N 21/44008 |
| 9,421,459 B2 * | 8/2016 | Ikeda | A63F 13/42 |
| 2007/0060389 A1 * | 3/2007 | Shimizu | A63F 13/10 463/43 |
| 2014/0094313 A1 * | 4/2014 | Watson | A63F 13/10 463/42 |

(Continued)

FOREIGN PATENT DOCUMENTS

| | | |
|---|---|---|
| JP | 2007313001 A | 12/2007 |
| JP | 2015013103 A | 1/2015 |

(Continued)

OTHER PUBLICATIONS

Office action from Korean Intellectual Property Office of 10-20180024240, dated Oct. 30, 2019.

*Primary Examiner* — Paul A D'Agostino
(74) *Attorney, Agent, or Firm* — STIP Law Group, LLC

(57) ABSTRACT

Provided is a method and an apparatus for replaying a video of playing a game. A video of playing a game already played in a terminal executing an online game is stored and replayed by executing the online game; storing the gaming video according to progress of the online game; detecting occurrence of a pre-configured event during progress of the online game; acquiring information about other character associated with a game character of the user after occurrence of the event; generating a replay video by combining the gaming video and the additional content; and outputting the replay video, wherein the additional content includes first additional content including information related to a game character of a user, second additional content including information about other character associated with a game character of the user, and third additional content including information related to an event.

18 Claims, 6 Drawing Sheets

(56) References Cited

U.S. PATENT DOCUMENTS

| | | | | |
|---|---|---|---|---|
| 2015/0037013 | A1* | 2/2015 | Thomas | G11B 27/007 386/343 |
| 2015/0290540 | A1 | 10/2015 | Trombetta et al. | |
| 2015/0328543 | A1* | 11/2015 | Lee | A63F 13/497 463/42 |
| 2015/0375102 | A1* | 12/2015 | George | A63F 13/00 463/24 |
| 2015/0375103 | A1* | 12/2015 | George | A63F 13/86 463/24 |

FOREIGN PATENT DOCUMENTS

| | | |
|---|---|---|
| KR | 1020060100696 A | 9/2006 |
| KR | 1020100037413 A | 4/2010 |
| KR | 1020110066289 A | 6/2011 |

\* cited by examiner

METHOD AND APPARATUS FOR REPLAYING VIDEO OF PLAYING GAME

CROSS-REFERENCE TO RELATED APPLICATION

This application claims priority to and the benefit of Korean Patent Application No. 10-2018-0024240, filed on Feb. 28, 2018, the disclosure of which is incorporated herein by reference in its entirety.

BACKGROUND OF THE INVENTION

The present invention relates to a method and an apparatus for replaying a video of playing a game: more particularly, for recording a video of playing a game and related environments of such playing and for reviewing or replaying such video and/or environments.

In general, a smart device such as a smartphone, a tablet PC, and a personal digital assistant (PDA) is characterized by its capability of installing an application program (hereinafter, it is referred to as an 'application') having a specific purpose and function and executing the application.

A computer game is a kind of play that makes a processor perform predetermined computations while enabling a player to interact with a computing device, displays the computation results on a screen or a display device, and thereby gives a pleasure to the player.

In most of the computer games where a player considers himself or herself as a game character, the player may have a desire to record and review a video of the game that he or she plays and to share the video with others. To satisfy such desire, some games provide a function of replaying a video of playing a game to replay a video of the entire game that a gamer plays. However, such replay function merely repeats playing a video of the whole game played, and, therefore, a gamer who wants to seek a specific game image must repeat a laborious task of searching for a desired game image by using functions of fast forward/fast reward.

A patent document (KR 10-2006-0100696) proposes a method for storing a video of a game at the occurrence of a specific event. However, such method stores a gaming video only from the occurrence of the specific event and, therefore, is unable to record an earlier scene that may be relevant to or a cause of the occurrence of the specific event. Recording the whole gaming video may overcome such problem but creates other problems of requiring an excessive storage capacity, causing an overload of data processing, and requiring too much time to edit only desired videos after the whole video is stored.

Conventional replay functions merely store a video of playing a game. Such video lacks excitement and information necessary to review the game played. As a result, it is difficult for a game player to achieve the goal of improving gaming skills merely by reviewing such video.

Meanwhile, there is a strong market expansion and demand in the e-sports industry, where professional gamers compete each other. For a professional gamer, it is necessary to carefully review details of the play to improve skills and performance. Such necessity may not be fulfilled by conventional replay functions, which simply records and replays a video of playing a game at a specific event.

SUMMARY OF THE INVENTION

The present invention solves the problems set forth above and provides a method for replaying a video of playing a game, which satisfies the needs of a user with a minimum amount of data processing.

The present invention provides a method for replaying a video of playing a game, which improves quality of a replayed video by combining not only the past gaming videos of a user but also additional content desired by a user.

The present invention provides a method for replaying a video of playing a game, which improves gaming skills by realizing the past game play settings in various environments.

The present specification provides a method for replaying a video of playing a game already played in a terminal executing an online game. The method according to an embodiment of the present invention may comprise executing a replay function which executes the online game and replays a video of playing the online game; storing the gaming video according to progress of the online game; detecting occurrence of a pre-configured event during progress of the online game; acquiring information about other characters associated with a game character of the user after occurrence of the event; generating a replay video by combining the gaming video and the additional content; and outputting or displaying the replay video, wherein the additional content includes first additional content including information related to a game character of a user, second additional content including information about other characters associated with a game character of the user, and third additional content including information related to an event.

Also, the method according to an embodiment of the present invention further comprises providing an interface for changing a configuration related to the replay function, wherein the configuration related to the replay function is used to match at least one of the first to the third additional content as additional content to be combined and a gaming video of the event.

Also, the present specification proposes a method for replaying a video of playing a game already played in a terminal executing an online game. The method according to an embodiment of the present invention may comprise executing the online game; executing a replay function which replays a video of playing the online game; storing a gaming video according to progress of the online game and additional content as game play information; detecting occurrence of an event during progress of the online game; generating a replay video by combining a gaming video of the event and additional content; and outputting the replay video, wherein the additional content includes first additional content including information related to a game character of a user and second additional content including information about other characters associated with the game character of the user, wherein the second additional content includes at least one or more information of a gaming video of other users at a viewpoint of the other users, a video at a viewpoint of a NPC, such as a monster, in the game, and input script of the other users.

Also, according to an embodiment of the present invention, the first additional content includes at least one or more information of a user input script entered by a user to play a game, a video of the user recorded through a camera during the online game, or a voice of the user spoken during the game, wherein the first additional content is matched to the gaming video according to progress of the online game and stored in real-time.

Also, according to an embodiment of the present invention, a step of generating a replay video includes inserting the user video into the gaming video at the occurrence of the event and combining the user voice and the game sound.

Also, according to an embodiment of the present invention, a step of generating a replay video includes generating a replay video by matching the gaming video and information about other characters included in the second additional content so as to be played at the same time and combining the gaming video and the information to be displayed simultaneously.

Also, according to an embodiment of the present invention, a step of generating a replay video includes generating a replay video outputting information of a character selected by a user by combining the gaming video and information of other characters included in the second additional content.

Also, according to an embodiment of the present invention, a step of generating a replay video includes generating a replay video by combining a gaming video of a user and information of other characters included in the second additional content to be shown sequentially in an alternate fashion.

Also, according to an embodiment of the present invention, a step of generating a replay video includes blurring a specific area of the gaming video.

Also, according to an embodiment of the present invention, a step of storing game play information further comprises storing the game play information generated according as the online game is progressed for a predetermined time period, wherein, when an event occurs during the predetermined time period, a time point before the occurrence of the event is determined as a replay start time; a time point after the occurrence of the event is determined as a replay end time; and the game play information ranging from the determined replay start time to replay end time is stored.

Also, according to an embodiment of the present invention, a step of storing game play information further comprises, if no event occurs while game play information is recorded for the predetermined time period, deleting the game play information sequentially in the order of oldest stored information.

Also, according to an embodiment of the present invention, the additional content includes third additional content including information related to an event, wherein the third additional content includes sub-event information related to an event configured as a condition for recording and information for reproducing the event situation, wherein the sub-event information includes item reinforcement probability information or item selection probability information, wherein the information for reproducing the event situation includes NPC-related information in association with a character of a user or other game environment information.

Also, according to an embodiment of the present invention, the second additional content and the third additional content are information received after occurrence of an event.

Also, according to an embodiment of the present invention, the method further comprises providing an interface for changing a configuration related to the replay function, wherein the configuration related to the replay function is used to match at least one of the first to the third additional content as additional content to be combined with a gaming video of the event.

Also, according to an embodiment of the present invention, the configuration related to the replay function determines at least one of unexpected combat situation, entering an instant dungeon, eliminating a boss monster, reinforcing an item with a failure/success probability, probabilistic selection of an item, enemy elimination or death, or level-up situation as an event to be stored.

Also, according to an embodiment of the present invention, a stop of outputting a replay video further comprises, after storing a game environment at the occurrence of the event, enabling a user to play the game again in the game environment at the occurrence of the event, wherein a result of playing the game again in the replay environment is not reflected in the result of the online game.

Also, according to an embodiment of the present invention, a step of enabling a user to play a game again in a game environment at the occurrence of an event includes enabling a user to play the game again in the game environment at the occurrence of the event by using a game character of another user associated with a character of the user at the occurrence of the event.

Also, the present specification provides an apparatus for replaying a video of playing a game. The apparatus according to an embodiment of the present invention may comprise a memory storing the online game program; a communication unit communicating with a server providing the online game; and a processor transmitting and receiving data to and from the server through the communication unit and executing the online game by reading out the online game program of the memory, wherein the processor is configured to execute the online game; execute a replay function; store a gaming video according to progress of the online game; detect occurrence of a pre-configured event during progress of the online game; generate a replay video by combining the gaming video and the additional content; and output the replay video, wherein the additional content includes first additional content including information related to a game character of the user and second additional content including information about other character associated with the game character of the user, wherein the second additional content includes at least one or more information of a gaming video of another user at a viewpoint of the another user, a video at a viewpoint of a NPC such as a monster in the game, and input script of the another user.

Also, according to an embodiment of the present invention, the first additional content includes at least one or more information of a user input script entered by a user to play a game, a video of the user recorded through a camera during the online game, or a voice of the user spoken during the game, wherein the first additional content is matched to the gaming video according to progress of the online game and stored in real-time.

Also, according to an embodiment of the present invention, the processor is configured to generate a replay video outputting information of a character selected by a user by combining the gaming video and information of other characters included in the second additional content.

Also, according to an embodiment of the present invention, the additional content includes third additional content including information related to an event, wherein the third additional content includes sub-event information related to an event configured as a condition for recording and information for reproducing the event situation, wherein the sub-event information includes item reinforcement probability information or item selection probability information, wherein the information for reproducing the event situation includes NPC-related information in association with a character of a user or other game environment information.

DETAILED DESCRIPTION OF THE INVENTION

The present invention describes specific embodiments in the appended drawings and in the specification in detail with reference to the drawings. However, the present invention may be modified in various ways and may provide various embodiments within the scope of the present invention. The effects and characteristics of the present invention and a method for achieving them may be clearly understood by referring to the embodiments described in the present specification in detail together with the appended drawings. It should be noted that the present invention is not limited to the embodiments disclosed herewith but may be implemented in various forms. In the following embodiments, the terms such as "first" and "second" are introduced for the purpose of distinguishing one element from the other. A singular expression should be understood to include a plurality thereof unless otherwise explicitly stated. Throughout the specification, the same or corresponding element is assigned to the same reference number, and the descriptions thereof are not redundantly repeated.

In the present invention, the method of replaying a video may include a step of recording and storing content as well as a step of displaying such content afterwards. A replay function is a function of executing such method of replaying a video. Game play information may include a gaming video and may further include additional content. A gaming video includes a video of a game footage seen through a user's terminal during playing the game. An additional content is content related to playing of the game other than the gaming video. A non-player character (NPC), also known as a non-playable character, is any character in a game which is not controlled by a player. NPC includes a monster character.

Figure 1:
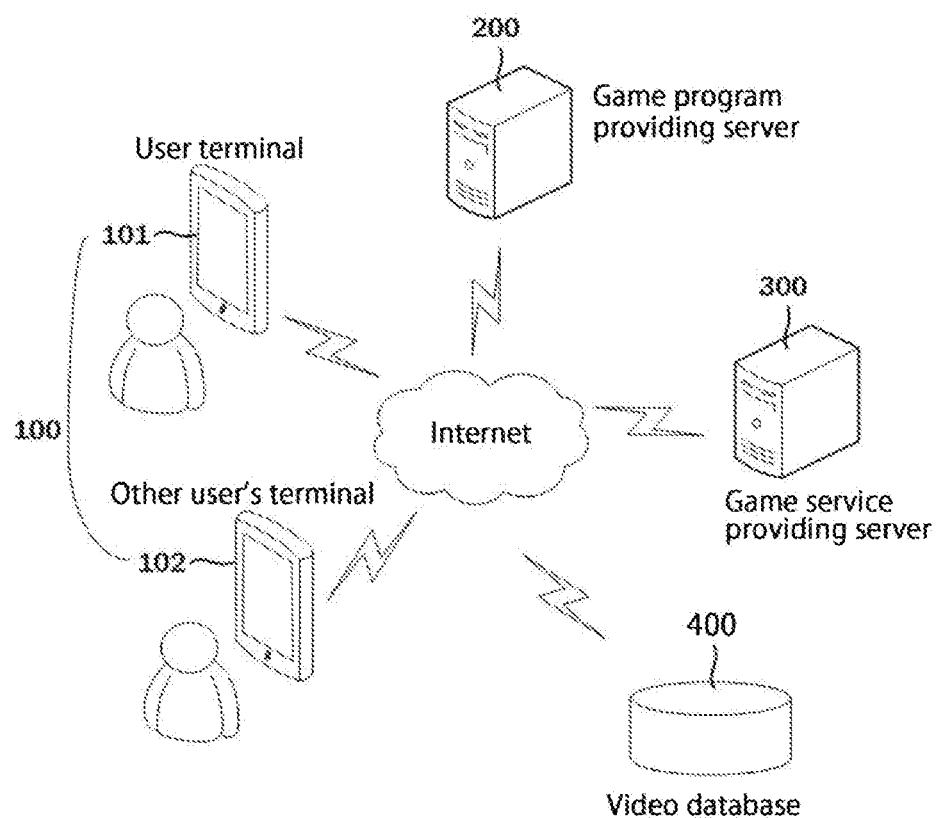
FIG. 1 is a block diagram of a system for replaying a video of playing a game according to an embodiment of the present invention.

FIG. 1 is a block diagram of a system for replaying a video of playing a game according to an embodiment of the present invention. Referring to FIG. 1, the system for replaying such video may comprise a terminal 100, a game program providing server 200, a game service providing server 300, and a video database 400. The terminal 100 may include a user terminal 101 and another user' terminal 102, which are connected to the same game as the user terminal.

The game program providing server 200 transmits a game program registered by a game program provider upon the request from the terminal 100. The game program providing server may correspond to one of the operating systems of the terminal 100 or a program store run by a manufacturer or communication company. The game program providing server 200 and the game service providing server 300 are described as separate servers in FIG. 1. However, the two servers may be integrated into a single server.

The game service providing server 300 transmits and receives data required to execute a game program to and from the terminal 100. The game service providing server may correspond to a server operated by a game provider. In other words, a game to be played may be a network-based, online game that may be played through the game service providing server 300. More specifically, the game to be played may be a multiplayer game that is connected through the Internet and played together by multiple users. Therefore, the terminal 100 for playing a game may include a user terminal and another user's terminal used for playing the same game together with the user.

The user terminal 101 and the another user's terminal 102 may be a device that executes a game program. Since the basic structures of the terminals are the same, the following descriptions are applied to both of the terminals 101 and 102. The terminal 100 may include a smartphone, mobile phone, laptop computer, desktop computer, personal computer, digital broadcasting terminal, personal digital assistant (PDA), portable multimedia player (PMP), navigation terminal, tablet PC, ultrabook, wearable device, or smart glass. The terminal 100 may download a game program from the game program providing server 200, install the downloaded game program, and execute the game program by transmitting date to and receiving data from the game service providing server 300. The user may play the game through the terminal 100.

Figure 2:
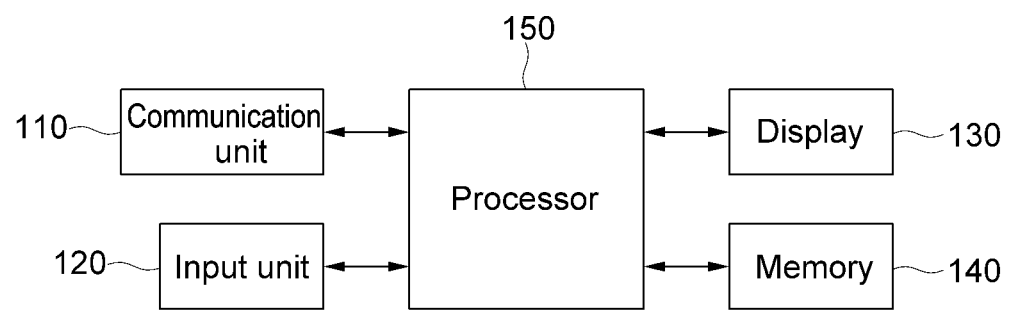
FIG. 2 is a block diagram of a user terminal performing a method for replaying a video of playing a game according to an embodiment of the present invention.

FIG. 2 is a block diagram of a user terminal 100. The terminal 100 may include a communication unit 110, an input unit 120, a display 130, a memory 140, and a processor 150. The terminal 100 may omit some of the elements described above or comprise additional elements.

The communication unit 110 may perform the role of a data passage from and to various kinds of external devices connected to the terminal 100. For example, the communication unit 110 may be connected to external servers in a wired or wireless manner and transmit data to and receive data from the external servers. In more details, the communication unit 110 may communicate with at least one of the game program providing server 200 and game service providing server 300 in a wired or wireless manner. More specifically, the communication unit 110 may download a game program from the game program providing server 200, and transmit to and receive from the game service providing server 300 various kinds of data for executing the game program. In addition, the communication unit 110 may be connected to input devices (for example, a mouse or a keyboard) to receive input from a user. The communication unit 110 may be connected to a display device (for example, a monitor) to transmit graphic images.

The communication unit 110 may include a wired/wireless headset port, an external charging port, a wired/wireless data port, a memory card port, a port connecting a device equipped with an identification module, an audio input/output (I/O) port, a video I/O port, or an earphone port. The communication unit 110 may include a short-range wireless communication module, such as a Bluetooth and a Wi-Fi module.

The input unit 120 may detect an input from the user. The input unit 120 may detect an input for turning on/off the terminal 100, an input for configuring a game itself or a replay function of a gaming video, and other inputs. The input unit 120 may include various buttons disposed on the terminal 100. The input unit 120 may include a touch sensor combined with a display unit or display device. The input device 120 may include input devices such as a mouse or keyboard connected through the communication unit 110.

The display 130 may display a graphic image. The display 130 may display graphic images related to a game or replaying of a gaming video. The display unit 130 may be a display device installed in a personal computer or a display device connected through the communication unit 110. The display 130 may include at least one of liquid crystal display (LCD), thin film transistor-liquid crystal display (TFT-LCD), organic light-emitting diode (OLED), flexible display, 3D display, and e-ink display.

The memory 140 may store a plurality of application programs run in the terminal 100, data for operating the terminal 100, and commands. The memory 140 may store a program for running a game and a program providing a function of replaying a gaming video. The memory 140 may correspond to one of various storage types such as ROM, RAM, flash drive, and hard drive; or a web storage performing a storage function of the memory 140.

The processor 150 may control the overall operation of each unit and execute a game. More specifically, the processor 150 may read out a game program from the memory 140, execute the game program, and provide a function of replaying a gaming video within the game program. The processor 150 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

Figure 3:
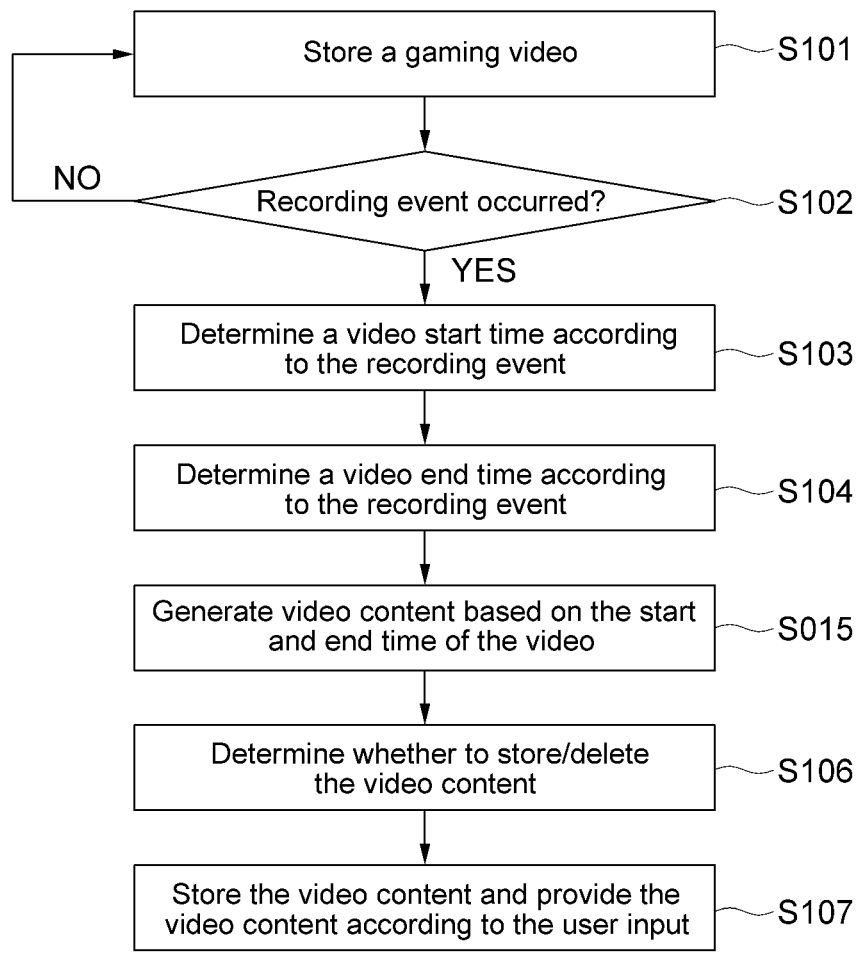
FIG. 3 is a flow diagram of a method for replaying a video of playing a game according to an embodiment of the present invention.

Referring to FIG. 3, while executing a game, the processor 150 may execute a game play video replay function, referred to as a "replay function", according to an execution input from the user or based on the user settings. More specifically, the processor 150 may execute a replay function when a user directly executes the replay function or pre-sets the replay function to be executed automatically.

The processor 150 of the present invention is designed to provide various functions and benefits that conventional processors may not provide. For example, the process 150 stores only a specific event situation selected by the user into a replay video instead of storing the whole video of the user's playing a game in a sequential manner. By doing so, the process may provide a desirable replay function by using a minimum amount of data capacity and a minimum data processing load. Additionally, the replay function may provide a high quality, highly informative game play information by easily combining additional content relating to the gaming video according to a user's desire such that the user's gaming video may be reviewed and studied effectively. Furthermore, the replay function of the present invention may help improve gaming skills by commencing recording of playing a game prior to a specific gaming situation in an online game and replaying the gaming situation afterwards.

Referring to the step S101, when the replay function is executed, the processor 150 may store game play information. The game play information may include a gaming video and may further include additional content.

The additional content may include a first additional content, which is related to the user input. More specifically, the first additional content may include at least one of a user input script (for example, a mouse input, a keyboard input, or a touch input log) entered by the user to play a game, a video of the user recorded through a camera, and a voice of the user spoken during the game. The first additional content may describe detailed information related to the user's playing a game or a video of anther user in addition to a gaming video and thereby improve fun and review quality of a replay video.

The game play information may include a second additional content, which is game play information of other characters related to the user. For example, the second additional content may include a game character information of another user associated with a game character of the user and/or game play information of a non-player character (NPC). In particular, the second additional content may include game play information of another user, such as a video taken from a viewpoint different from that of the user at the time of playing the game or input script of the another user. The second additional content may further include NPC game play information related to a game character played by the user. Such NPC game play information includes a video from a viewpoint of the NPC and behavior information of the NPC. The second additional content enriches information about an event and provides useful information when the user reviews the event situation.

The game play information may include a third additional content related, which is related to game play environments. The third additional content may include game environment information: for example, information needed to reproduce the game environment at an event situation or sub-event information. The sub-event information may include item reinforcement probability information or item selection probability information, and the information for reproducing the event situation may include monster-related information in association with the game character of a user or other game environment information.

If the second or the third additional content is transmitted to the terminal 100 in the middle of playing a game, the game play may be exposed to a risk of being cheated or hacked. Therefore, it is preferable to receive the second or the third additional content from a game play providing server or another user's terminal after the game play is completed.

Regarding the replay function, the replay function of the present invention may produce a highlight replay video about a specific event situation desired by the user. In other words, the processor 150 may produce a highlight replay video corresponding to the occurrence of a predetermined, specific event situation. However, if a gaming video can be recorded only from the beginning of such occurrence, a video of incidents prior to such occurrence cannot be stored. Conventionally, such limitation may be overcome only by recording the video of playing a game in entirety, which requires an excessive amount of data storage and processing capacity. According to an embodiment of the present invention, the processor 150 may store game play information for a predetermined time period when the replay function is executed and selectively store or delete the game play information according to the occurrence of an event.

For example, if an event occurs while game play information is recorded for a predetermined time period, the processor 150 may store the game play information from the replay start time to the replay end time. On the other hand, if no event occurs while game play information is recorded for a predetermined time period, the processor 150 deletes the stored game play information sequentially in the order of oldest to latest, thereby minimizing the amount of data processing load or required capacity.

More specifically, referring to the step S102, the processor 150 may detect the occurrence of an event S102 while continuously storing game play information for a predetermined time period and deleting some stored game play information after a predetermined time period. At this time, the event to be replayed is a specific situation satisfying the needs of the user. Such event to be replayed may be determined based on an event that the user has configured directly or an event stored and/or deleted after the user plays a game.

The processor 150 may list events to be stored in the replay function so that the events may be selected. For example, the processor 150 may configure, as an event to be stored, at least one of an unexpected combat situation in the field, a situation of entering an instant dungeon, a situation of eliminating a boss monster, a situation of reinforcing an item with a failure/success probability, a situation of probabilistic selection of an item, a situation of enemy elimination or death, and a level-up situation.

At this time, the processor 150 may minimize the amount of processing stored data by matching additional content to be stored differently for each event. For example, in the case of item reinforcement, only the information required to generate an item reinforcement image may be stored by adding only the reinforcement probability information for each item, user video, and user voice as additional content. The matching of additional content to be stored for each event may be configured by default or carried out by user configuration. For example, the processor 150 may store a table that matches additional content to be stored for each individual event; at the occurrence of an event, extract the additional content matching the occurring event from the table; and store the extracted additional content as the information required to generate a video with respect to the occurring event.

After generating a game replay video, the processor 150 allows the user to decide whether to store or delete the replay video, change a configuration of an event to be stored afterwards, and thereby improve the user convenience and experience. For example, if the user deletes a combat defeat event video more than two times, the processor 150 may exclude the combat defeat event from the event configuration for storing.

Referring to the step S103, the processor 150 may determine a time at which a replay video starts when an event occurs. As described above, if a video is recorded at the occurrence of an event, the whole situation relating to the event, including incidences prior to such occurrence may not be stored. To solve this problem, the processor 150 may start recording a video from a replay start time which is earlier than the time of the such occurrence. More specifically, the processor 150 may determine a replay start time from which a replay video is to be recorded and generate the replay video with the game play information from the replay start time, wherein the game play information is stored for a predetermined time period.

Referring the step S105, the processor 150 may determine a replay end time at which a replay video ends. The processor 150 may determine a time after the occurrence of an event as a replay end time. For example, at the occurrence of an event where a game character of the user dies, the processor 150 may determine a time after the character's death as a replay end time.

Figure 4A:
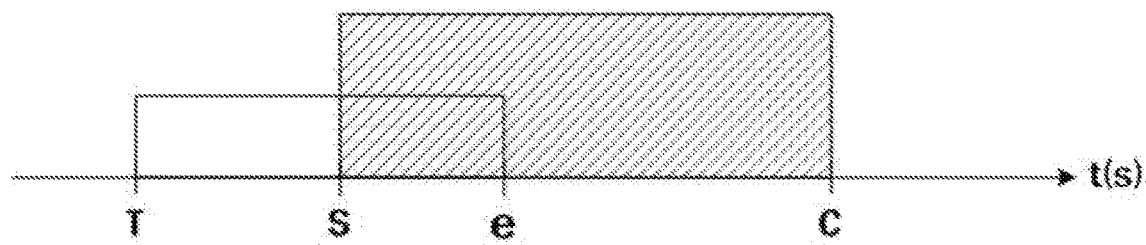
FIGS. 4a and 4b illustrate a method for storing game play information according to an embodiment of the present invention.

Referring to FIG. 4a, while a game is played, the processor 150 may start storing game play information at a predetermined time (T). And, if an event occurs, a time point before the occurrence of the event (e) may be determined as a replay start time (s), and a time point after the occurrence of the event (e) may be determined as a replay end time (c).

From pre-stored data, the processor 150 may store the game play information from the replay start time (s) to the replay end time (c).

Figure 4B:
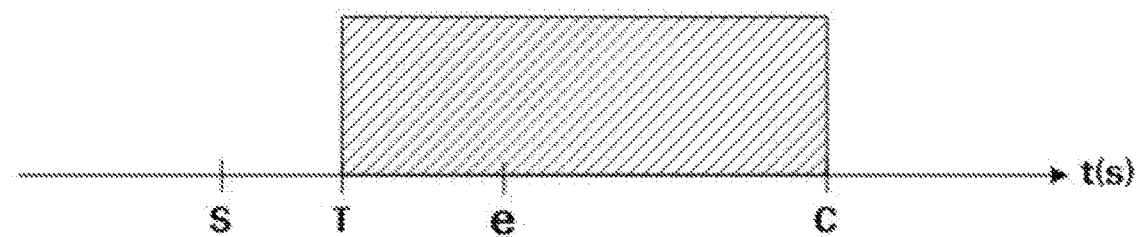

As shown in FIG. 4b, if an event occurs at the time (e), and the replay start time (s) is before the predetermined time (T), game play information ranging from the predetermined time (T) to the replay end time (c) may be stored. In this case, it is not possible to generate a replay video for the whole event situation. However, the processor 150 may modify the configuration to extend the predetermined time (T) such that the whole event situation can be stored.

Referring the step S105, after determining the replay end time, the processor 150 may generate a replay video based on the game play information from the replay start time to the replay end time. After storing the game play information from the replay start time to the replay end time, the processor 150 may generate a replay video based on the game play information. At this time, by combining the replay video with not only a gaming video but also additional content, the processor 150 may deliver richer game information or induce more interest regarding the event.

For example, the processor 150 may provide a replay video combining a gaming video and the first additional content. The processor 150 may receive the second additional content as the game play information from another user's terminal and/or the game service providing server 300 through the communication unit 110.

As described above, if the second additional content is transmitted in the middle of playing a game under an event situation, the second additional content may be exploited by a game cheater program, and, therefore, it is preferable to receive the second additional content from the game service providing server 300 after the event situation ends.

The processor 150 may receive the third additional content as game play information from the game server 300 through the communication unit 110. Then, the processor 150 may generate a replay video by combining the gaming video and the additional content.

At this time, the processor 150 may provide a replay video editing function, which edits and combines the gaming video and additional content according to the needs of the user. The replay video editing function may be performed automatically by the processor 150 according to a configuration or may be performed through a user editing interface when a replay video is deleted/stored after a user finishes playing a game.

More specifically, the processor 150 may combine inside or outside additional content of a gaming video by executing the replay video editing function or may combine additional content with the gaming video at different times. As one example, the processor 150 may insert a user video capturing the image of the user into the gaming video and incorporate an additionally recorded user voice into the game sound. At this time, the replay video editing function provides a function of adjusting and editing the sizes of the user video and the user voice according to time, thereby supporting the user to generate a more interesting replay video.

At the time of item selection from continuous purchasing, the processor 150 may store purchased items and ratios and values of the items within the gaming video. The processor 150 may store a cumulative value or an average value of the damage imposed on a monster within the gaming video.

The processor 150 may store another's gaming video related to an event that a user has experienced or a video from a different viewpoint (for example, the user character video as seen by a boss monster) by combining the video through the replay video editing function.

Figure 5A:
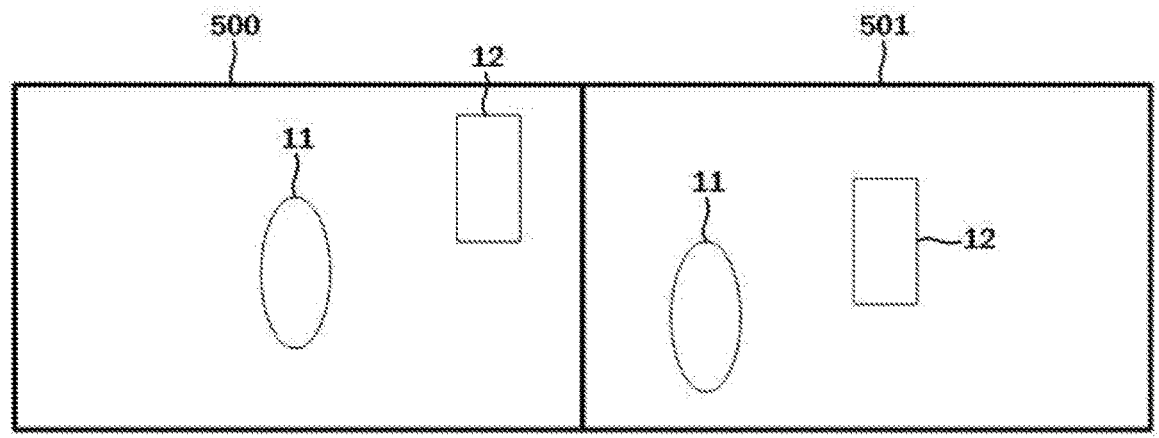
FIGS. 5a, 5b and 5c illustrate a method for editing additional content according to an embodiment of the present invention.

The following descriptions are based on another user's gaming video. Referring to FIG. 5a, the processor 150 may synchronize the user's gaming video 500 with another user's gaming video 501 so that they may be played at the same time and generate a replay video that displays both of the videos simultaneously.

Figure 5B:
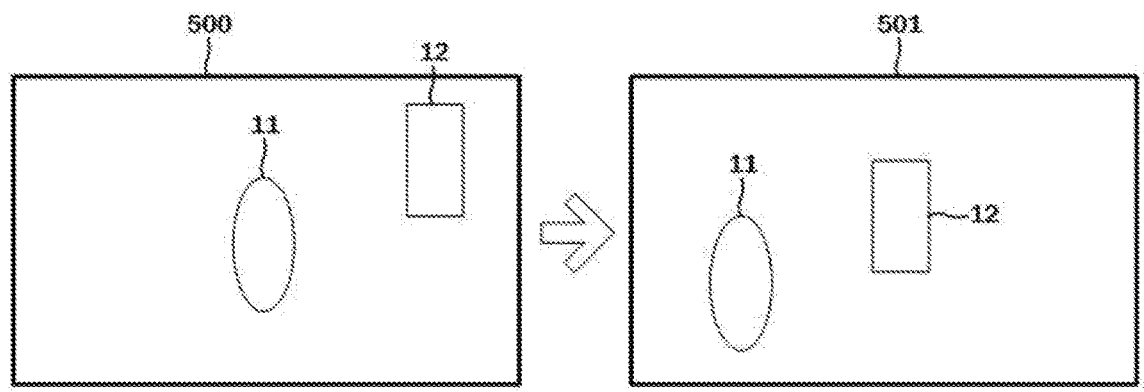

Referring to FIG. 5b, the processor 150 may generate a replay video that shows the gaming video 500 of a character 11 selected by the user by combining the gaming video 500 of the user and the gaming video of another user. For example, while the gaming video 500 at the viewpoint of the user is shown upon selection of the user's character 11 by the user, the replay video may show the gaming video 501 at the viewpoint of the another user if the user selects the character 12 of the another user.

Figure 5C:
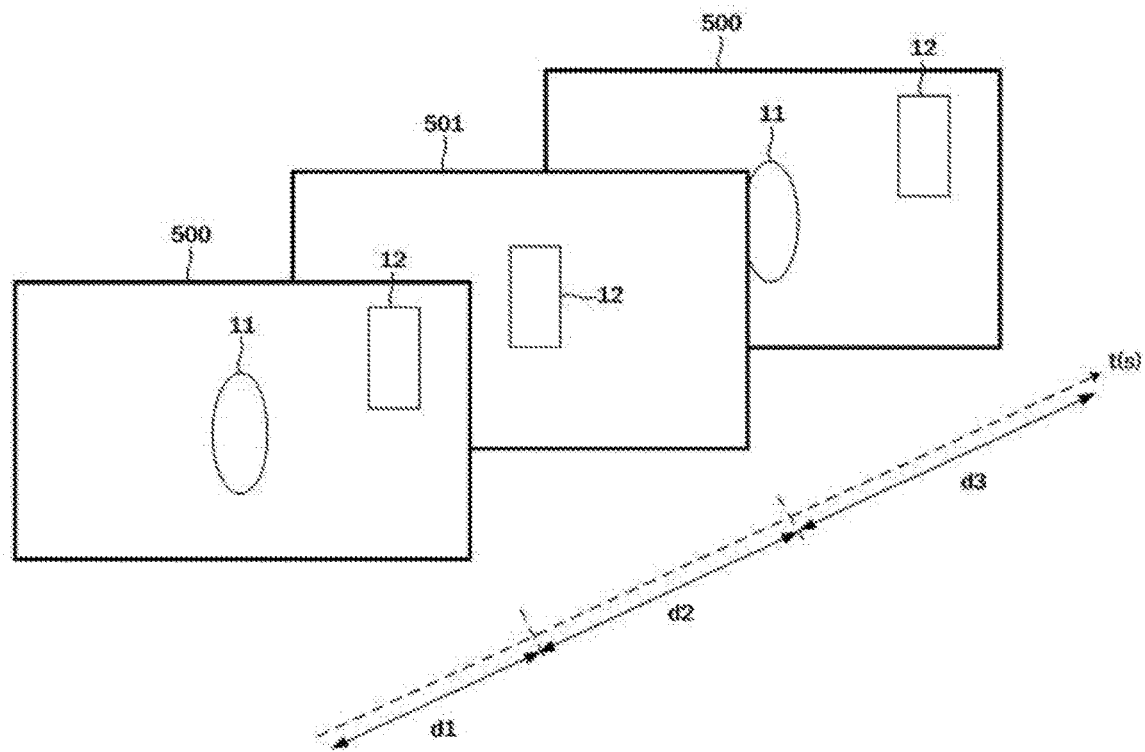

Referring to FIG. 5c, the processor 150 may generate a replay video such that the gaming video 500 of the user and the gaming video 501 of another user are shown sequentially in an alternate fashion. In other words, according to the user's selection, the processor 150 may display the user's gaming video 500 for a first time period d1, the another user's gaming video 501 for the second time period d2, and again the user's gaming video 500 for the third time period d3.

Through the various replay video editing functions, the user may generate a replay video in an easy manner according to the user's desire.

Figure 6:
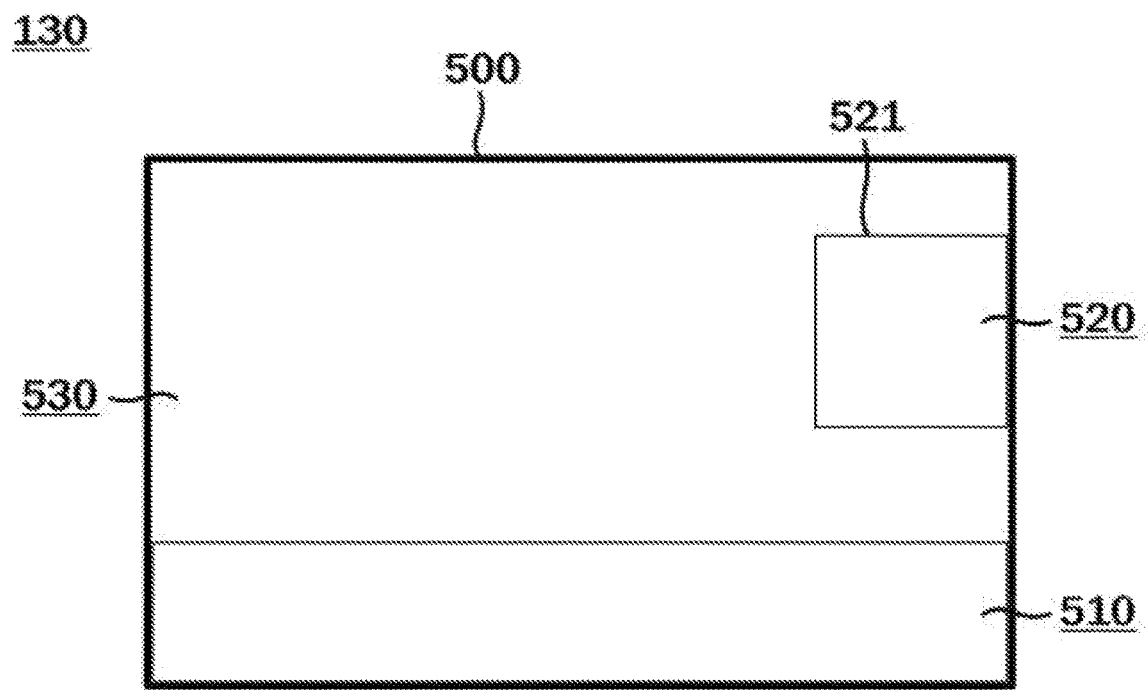
FIG. 6 illustrates a method for editing privacy protection when replaying a video of playing a game according to an embodiment of the present invention.

Referring to FIG. 6, the replay video editing function may blur an image displayed at a specific position or specific information to protect the user's privacy. If receiving a blur configuration with respect to specific information, the processor 150 may blur a first area 510 displaying the specific information to protect the user's privacy. At this time, if the position or size of the first area 510 displaying the specific information is changed, the area over which blurring is applied may also be changed accordingly. For example, if the user blurs a chatting window, the area displaying the chatting window is blurred continuously to prevent a chat from being exposed in the replay video. If the user selects a second area 520 and requests blurring of the corresponding area, the processor 150 may blur the second area 520 and thus easily protect the user's privacy.

The processor 150 may store a game environment itself rather than merely store a gaming video at the occurrence of an event and may allow a user to play the game again in the corresponding event environment. In other words, the processor 150 provides an event replay function that enables a user and another user to play a game again in the event situation. More specifically, the processor 150 may provide an event replay function that enables the user to play a game again in a game environment (for example, a character position or level) at the replay start time or at a time point selected by the user in the event situation.

The event replay function of the present invention may be associated not only with a character of the user but also with a character of another user within the event situation. In order to provide such event replay function in an online game, game play information may further store game environment information to be used for playing an event again. More specifically, the game service providing server 300 may provide data so that the user may play the game in an environment regenerating the same event situation based on the game environment information.

For example, when the event replay function is performed, if a game character of another user is associated with the event occurrence environment, the processor 150 may perform the event replay function differently according to the intent of the another user with respect to performing the event replay function. More specifically, if a user and another user are connected to a game and agree with each other to perform the event replay function, the processor 150 may enable the user and the another user to play the event situation again from the replay start time. At this time, a third person may join as a third user. Also, the processor 150 may provide a function for replaying the event situation by switching the characters of the user and another user.

When the event replay function is executed only by the user, the character of another user is controlled directly by the game service providing server 300 or processor 150, and the user is enabled to play the event situation again from the replay start time. At this time, the processor 150 controls the character of the another user based on the script entered by the another user and thereby improves reproducibility of the replay environment.

The event replay function enables the user to play the event situation again in various environments and thus achieve the goal of improving the user's gaming skills.

The processor 150 may not need to apply a changed situation through the event replay function to the existing online game environment. For example, even if a game result between the user's character and another user's character is changed through the event replay function, the online game may be continued complying with the game result before the event replay function is executed. In other words, although the event replay function enables a user to experience only a specific situation again, the play information that may have been changed through the event replay function may not be reflected in the online game or game service providing server 300. For example, even if a win/loss result between the user's character and another user's character is changed through a replay, the changed result may be ignored in win/loss statistics.

Referring the step S106, if generating a replay video is completed, the processor 150 may allow the user to select whether to store the replay video. The processor 150 automatically generates a replay video while a configuration is completed and allows the user to select whether to store/delete the replay video. However, it is also possible to store game play information according to an event situation and to generate a replay video according to an input from the user when the user selects to store the replay video.

The processor 150 may provide a function of allowing the user to select whether to store a generated replay video and a replay editing function for editing the replay video to better serve the user's preferences when the replay video is stored.

Referring to the step S107, when the user executes a replay video, the processor 150 may display the replay video through the display 130. By outputting a replay video containing both a gaming video and additional content, the processor 150 may improve a fun element or review quality of the replay video.

The processor 150 may provide an event replay function that allows a user to play a game again from a replay start time. At this time, a character of another user associated with the event may be controlled directly by the processor 150 or through data received from the game service providing server 300. The processor 150 may ignore a game result obtained through the event replay function in continuing the online game and provide the game result only for the reviewing purpose.

The embodiments of the present invention described above may be implemented in the form of program commands, which may be executed through various types of computer elements and recorded in a computer-readable medium. The computer-readable medium may include program command, data files, and data structures separately or in combination thereof. The program commands recorded in the medium may be designed and composed specifically for the present invention or may be commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes that may be executed by a computer through an interpreter and the like. The hardware device may be composed to be operated by one or more software modules to perform the operations of the present invention, and vice versa.

A method for replaying a video of playing a game according to the present invention stores a specific event situation according to a user's needs in the form of a replay video rather than a video of the user's entire play, thereby providing a replaying function by using the minimum data capacity and data processing load.

Also, a method for replaying a video of playing a game according to the present invention provides a high quality gaming video by combining additional content related to the gaming video in an easy manner so that a user's gaming video may be reviewed effectively.

Also, a method for replaying a video of playing a game according to the present invention improves gaming skills by providing a function for storing a specific gaming situation in an online game and replaying the gaming situation.

The invention claimed is:

1. A method for replaying a video of an online game being played by a user, the method comprising:
    storing a gaming video in a processor while the user is playing the online game using a terminal, wherein the processor is included in the terminal;
    detecting an occurrence of a pre-configured event using the processor;
    acquiring an additional content;
    generating a replay video by combining the gaming video and the additional content; and
    displaying the replay video,
    wherein the additional content comprises:
    a first additional content including information related to a game character of the user in the online game,
    a second additional content including information about another character associated with the game character of the user, and
    a third additional content including information related to the pre-configured event, wherein the method further comprises providing an interface for changing a configuration that is used to match at least one of the first to the third additional contents as additional content and the gaming video of the event, and
    wherein the first additional content includes at least one information of a user input script entered by the user to play a game, a video of the user recorded by a camera while the user is playing the online game, and a voice of the user spoken while the user is playing the online game, wherein the first additional content is matched to the gaming video while the online game is played and stored in real-time.

2. A method for replaying a video of an online game being played in a user's terminal, the method comprising:
    storing a game play information while the user is playing the online game, wherein the game play information contains a gaming video and an additional content, and the gaming video is stored in a processor included in the terminal;
    detecting an occurrence of a pre-configured event using the processor;
    generating a replay video that combines the gaming video and the additional content; and
    displaying the replay video on the display included in the terminal,
    wherein the additional content comprises:
    a first additional content including information related to a game character of the user in the online game,
    a second additional content including information about another game character associated with the game character of the user, wherein the second additional content further comprises at least one information of a gaming video of another user at a viewpoint of the another user, a video at a viewpoint of a non-player character (NPC) in the game, and an input script of the another user, and
    wherein the step of generating the replay video includes blurring a specific area of the gaming video.

3. The method of claim 2, wherein the first additional content further includes at least one information of a user input script entered by the user to play a game, a video of the user recorded by a camera while the user is playing the online game, and a voice of the user spoken while the user is playing the online game, wherein the first additional content is matched to the gaming video while the online game is played and stored in real-time.

4. The method of claim 3, wherein the step of generating the replay video includes inserting the user video into the gaming video at the occurrence of the event and combining the user voice and the game sound.

5. The method of claim 2, wherein the step of generating the replay video includes generating the replay video by matching and combining the gaming video and the information about the another character such that the gaming video and the information about the another character are displayed simultaneously.

6. The method of claim 2, wherein the step of generating the replay video includes generating a replay video outputting information of the user character by combining the gaming video and information of the another character included in the second additional content.

7. The method of claim 2, wherein the step of generating the replay video includes generating the replay video such that the gaming video of the user and the gaming video of the another user are displayed sequentially in an alternate fashion.

8. The method of claim 2, wherein, in the step of storing the game play information, the play information is initially stored for a predetermined time period, and wherein, if the event occurs during the predetermined time period, a time point before the occurrence of the event is determined as a replay start time; a time point after the occurrence of the event is determined as a replay end time; and the game play information during a time period from the replay start time to the replay end time is stored.

9. The method of claim 8, wherein, if no event occurs during the predetermined time period, the stored game play information is deleted sequentially in the order of earliest to latest.

10. The method of claim 2, the additional content further comprising a third additional content, the third additional content including information related to the event,
wherein the third additional content includes sub-event information related to the event configured as a condition for recording and information for reproducing the event situation,
wherein the sub-event information includes item reinforcement probability information or item selection probability information, and
wherein the information for reproducing the event situation includes NPC-related information in association with the game character of the user or another game environment information.

11. The method of claim 10, wherein the second additional content and the third additional content are information received after the occurrence of the event.

12. The method of claim 10, further comprising providing an interface for changing a configuration that is used to match at least one of the first to the third additional content and the gaming video of the event.

13. The method of claim 12, wherein the configuration determines at least one of an unexpected combat situation, entering an instant dungeon, eliminating a boss monster, reinforcing an item with a failure and/or success probability, probabilistic selection of an item, enemy elimination or death, or a level-up situation as the event to be stored.

14. The method of claim 2, wherein the step of displaying the replay video enables the user to play the game again in the game environment at the occurrence of the event after the game environment at the occurrence of the event is stored, and wherein a result of playing the game again in the replay environment is not reflected in the online game.

15. The method of claim 14, wherein the step of enabling the user to play the game again enables the user to use a game character of the another user associated with the user's game character at the occurrence of the event.

16. An apparatus for replaying a video of playing an online game, the apparatus comprising:
a memory storing a program of the online game;
a communication unit communicating with a server providing the online game; and
a processor transmitting data to and receiving data from the server through the communication unit and executing the online game by reading out the online game program of the memory,
wherein the processor is configured to:
execute the online game; store a gaming video according to progress of the online game; detect occurrence of a pre-configured event during progress of the online game; generate a replay video by combining the gaming video and the additional content; and output the replay video,
wherein the additional content includes a first additional content including information related to a game character of the user and a second additional content including information about another game character associated with the game character of the user,
wherein the second additional content includes at least one or more information of a gaming video of another user at a viewpoint of the another user, a video at a viewpoint of a NPC in the game, and an input script of the another user, and
wherein the first additional content includes at least one or more information of a user input script entered by the user to play the online game, a video of the user recorded through a camera during the online game, or a voice of the user spoken during the online game, wherein the first additional content is matched to the gaming video according to progress of the online game and stored in real-time.

17. The apparatus of claim 16, wherein the processor is configured to generate a replay video outputting information of the game character selected by the user by combining the gaming video and information of the another game character included in the second additional content.

18. The apparatus of claim 16, wherein the additional content further comprises a third additional content including information related to an event,
wherein the third additional content includes sub-event information related to the event configured as a condition for recording and information for reproducing the event situation,
wherein the sub-event information includes item reinforcement probability information or item selection probability information, and
wherein the information for reproducing the event situation includes NPC-related information in association with the game character of the user or other game environment information.

* * * * *